3,348,925
REFRACTORY COMPOUND AND METHOD OF PRODUCTION
Howard J. Bartlett, Niagara Falls, Ontario, Canada, assignor to Norton Company, Worcester, Mass., a corporation of Massachusetts
No Drawing. Filed July 27, 1964, Ser. No. 385,493
1 Claim. (Cl. 23—315)

I have discovered a new composition of matter, the formula of which appears to be aluminum borocarbide, AlBC, and a method for producing it. The material has a hardness greater than quartz, but less than alumina. Its hardness is close to that of zirconia and thus it can be empolyed as an abrasive. Fabricated shapes of this compound may be made by hot-pressing and are useful as refractory boats, spouts, and crucibles for containing molten metals. It may also be employed as an additive to promote the bonding of hot-pressed shapes of such materials as aluminum nitride and silicon carbide.

Its melting point is above 1800° C., and it has a density of about 3 gm./cm. X-ray powder patterns of the material indicate that it belongs to the hexagonal crystal system.

The X-ray powder diffraction pattern of the new aluminum borocarbide is given below. I prefer to define my compound in terms of its X-ray pattern because I have not definitely established that the exact formula for the compound is AlBC. However, I do know that the molal ratios of Al to B to C in the compound are substantially 1 to 1 to 1 as compared to compounds previously reported in the literature, such as $Al_2B_{48}C_2$ reported in Mellor's well-known text on Inorganic and Theoretical Chemistry. The data in the table given below were obtained by standard X-ray powder techniques. The radiation was the K-alpha doublet of copper and a Geiger counter spectrometer with a strip chart pen recorder was used. The interplanar spacings, $d$, were calculated from the positions of the peaks on the chart. In the table $s$ stands for a strong reflection peak, $m$, a medium reflection, $w$, a weak, and $vw$, very weak.

| d | I | d | I |
|---|---|---|---|
| 7.93 | s | 1.665 | vw |
| 3.97 | m | 1.599 | vw |
| 3.14 | vw | 1.567 | w |
| 2.95 | m | 1.516 | mw |
| 2.89 | vs | 1.469 | mw |
| 2.642 | m | 1.432 | mw |
| 2.370 | s | 1.383 | mw |
| 2.160 | w | 1.336 | w |
| 2.080 | vw | 1.292 | s |
| 1.980 | ms | 1.207 | m |
| 1.799 | ms | 1.132 | vw |
| 1.702 | s | 1.113 | w |

Although this pattern indicates the presence of minor amounts of Al and $B_4C$, it shows the major constituent of the composition to be a new crystalline material which can, at least approximately, be identified as a compound of Al, B, and C in equimolal ratio.

The following is an example of the preparation of this aluminum borocarbide having the X-ray reflection pattern specified above:

A homogeneous 150 gram reaction mix consisting, by weight, of 20.4% finely divided aluminum, 52.6% boron oxide, and 27% powdered graphite was placed in a graphite crucible and fired in an argon atmosphere for one hour at a temperature of 2000° C. The fused cake which resulted was crushed to pass through a 100 mesh screen (U.S. Standard) and a sample taken for wet chemical analysis. The analysis results are shown in the table.

| | Percent by wt. |
|---|---|
| Carbon | 21.76 |
| Boron | 26.46 |
| Aluminum | 49.24 |
| Iron | 0.08 |
| Titanium | 0.20 |
| Oxygen | ¹2.26 |

¹ By difference.

The oxygen indicated in the table is presumably present as boron oxide glass, $B_2O_3$, which is not detectable by the X-ray analysis.

I have also formed this aluminum borocarbide by substituting boron carbide for the boron oxide in the example, and heating at the same temperature. Aluminum oxide has been employed in the reaction instead of aluminum to produce the aluminum borocarbide. This method of reaction can be considered a two-step process in which the alumina is first reduced to aluminum by the carbon and then reacts with the boron and remaining carbon. The compound can be formed by direct reaction of the elements, but that method appears less desirable due to the relatively high cost of elemental boron.

I claim:

Aluminum borocarbide, a compound of aluminum, boron, and carbon in equimolar proportions having the following $d$ spacings and intensities as determined by powder X-ray diffraction:

| d | I | d | I |
|---|---|---|---|
| 7.93 | s | 1.665 | vw |
| 3.97 | m | 1.599 | vw |
| 3.14 | vw | 1.567 | w |
| 2.95 | m | 1.516 | mw |
| 2.89 | vs | 1.469 | mw |
| 2.642 | m | 1.432 | mw |
| 2.370 | s | 1.383 | mw |
| 2.160 | w | 1.336 | w |
| 2.080 | vw | 1.292 | s |
| 1.980 | ms | 1.207 | m |
| 1.799 | ms | 1.132 | vw |
| 1.702 | s | 1.113 | w |

References Cited

Matkovich et al.: Presence of Carbon in Aluminum Borides, J. Am. Chem. Soc., vol. 86, pages 2337–2340, June 20, 1964.

Mellor: Comprehensive Treatise on Inorganic & Theoretical Chemistry, vol. 5, page 872, 1924, Longmans, Green and Co., New York, 1924.

OSCAR R. VERTIZ, *Primary Examiner.*

H. S. MILLER, *Assistant Examiner.*